United States Patent [19]
Van Den Elst et al.

[11] Patent Number: 4,881,508
[45] Date of Patent: Nov. 21, 1989

[54] HEATING DEVICE FOR FLUID, PARTICULARLY FUEL

[75] Inventors: Fredrik M. N. Van Den Elst, Almelo; Jan Bakker, Hengelo, both of Netherlands

[73] Assignee: Texas Instruments Incorporated, Dallas, Tex.

[21] Appl. No.: 157,817

[22] Filed: Feb. 19, 1988

[30] Foreign Application Priority Data

Feb. 20, 1987 [NL] Netherlands ................. 8700430

[51] Int. Cl.$^4$ ............................................. F02M 31/12
[52] U.S. Cl. ..................................... 123/549; 165/160
[58] Field of Search ................. 123/549, 557; 165/160

[56] References Cited

U.S. PATENT DOCUMENTS

| | | | |
|---|---|---|---|
| 4,349,001 | 9/1982 | Wagner | 123/557 |
| 4,395,618 | 7/1983 | Cunningham | 165/160 |
| 4,419,564 | 12/1983 | Marcoux | 123/549 |
| 4,477,715 | 10/1984 | Bell et al. | 123/549 |
| 4,501,255 | 2/1985 | Van Der Pldeg et al. | 123/549 |
| 4,585,924 | 4/1986 | Pakula | 123/557 |

FOREIGN PATENT DOCUMENTS 0284120 9/1988 European Pat. Off. ............ 123/549

Primary Examiner—Willis R. Wolfe
Assistant Examiner—M. Macy
Attorney, Agent, or Firm—James P. McAndrews; John A. Haug; Melvin Sharp

[57] ABSTRACT

A heating device for fuel or other fluid, in particular to prevent solidification of paraffin constituents in diesel oil, comprises a housing (1) with an inlet (14) and an outlet (15) for the fuel, and a number of metal plates (3, 4) inside the housing. Tablets or heater elements (5) made of a ceramic material with a positive temperature coefficient (PTC) are fastened on the metal plates so that heat and electricity is conducted. To improve the heat transfer one or more turbulators (6; 6a, 6b) are placed between two of the above-mentioned metal plates, (3, 4) provided with PTC tablets. Passages (16, 17) are present to make the infed fuel flow from the inlet (14) over the first metal plate, through a turbulator and over the second metal plate to the outlet (15).

4 Claims, 2 Drawing Sheets

HEATING DEVICE FOR FLUID, PARTICULARLY FUEL

BACKGROUND OF THE INVENTION

The invention relates to a heating device for fuel, in particular diesel oil, comprising a housing with an inlet and an outlet for the fuel, at least one metal plate which is disposed inside said housing, and on which tablets made of a material with a positive temperature coefficient (PTC) are fastened in a way which conducts heat and electricity, and means for the supply of electric power.

Such a device is known from U.S. Pat. No. 4,501,255.

Paraffin constituents and the like in diesel oil have a tendency to solidify again when cold, which can cause the fuel filter to become blocked. This disadvantage can be prevented by using the above-mentioned device.

In the known device the metal plate is provided on two sides with partitions which define flow paths. This principle exhibits the problem that, due to the low flow velocity of the fuel through the flow paths, the flow will be essentially laminar. The heat transfer is therefore not optimum. The low coefficient of heat transfer means that, in order to obtain a satisfactory result, the dimensions of the heating device have to be relatively large.

SUMMARY OF THE INVENTION

The object of the invention is to eliminate this disadvantage, and for this purpose at least one turbulator is placed between two of the above-mentioned metal plates provided with PTC tablets, passages being present to make the infed fuel flow from the inlet over the first metal plate, through the turbulator and over the second metal plates to the outlet.

In particular, if a turburlator of the strip-fin type is used, so-called artificial turbulence is produced, and this leads to a considerable improvement in the heat transfer to the fuel, with relatively little increase in pressure drop. The external dimensions of the device can be kept relatively small.

The invention also provides the possibility of increasing the heating of the fuel by the PTC tablets and/or replacing it by heating with heated cooling liquid from the engine, if that water has reached the desired temperature. For this purpose a turbulator with connecting elements for heated cooling liquid is placed between two of the turbulators through which the fuel is to pass, while a passage for the fuel is provided on one side of said cooling liquid turbulator.

When switched on, the cooling liquid turbulator gives off its heat to the turbulators through which the fuel is to flow. In the inlet to the cooling liquid turbulator it is preferable to dispose a thermostatically controlled valve which opens as soon as the cooling liquid reaches a particular temperature. In general, it will be preferable to switch off the power supply to the PTC tablets as soon as the heated cooling water has taken over heating of the fuel. That is not, however, necessary.

The invention is particularly applicable to a vessel or vehicle with diesel engine, but heating of domestic fuel for a central heating plant is another possible application.

Turbulators of the strip-fin type are described, in the book "Compact Heat Exchangers" by W.M. Kays and A.L. London, published by McGraw-Hill Book Company, third edition as in the design on p. 185, FIGS. 9–16.

The passages for taking the fuel from a metal plate provided with PTC tablets to a turbulator and from a turbulator to another metal plate provided with PTC tablets could consist of the internal space of U-shaped headers separating parts of the housing from each other. It is, however, simpler to provide elongated grooves in the plates themselves.

DESCRIPTION OF THE DRAWINGS

The invention will now be explained in greater detail with reference to a number of examples of embodiments shown in the figures.

DESCRIPTION OF PREFERRED EMBODIMENTS

The devices shown are intended for heating of fuel, in particular diesel oil. The devices will in particular be usable in a vehicle or vessel with diesel engine, where there is a risk of blockage of the fuel filter through the solidification of certain constituents in cold weather.

Figure 1:
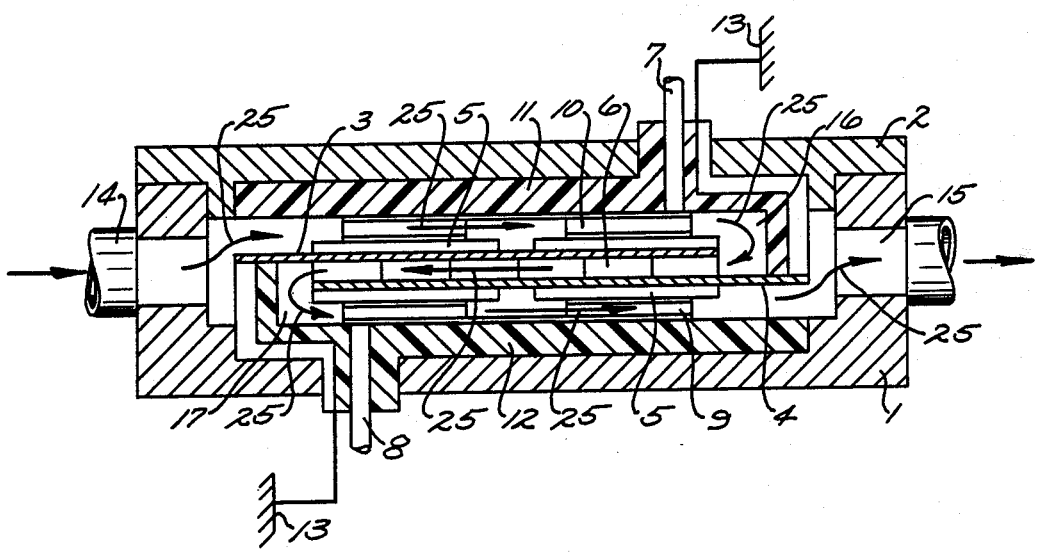
FIG. 1 shows a longitudinal section of a first embodiment.

The device shown in FIG. 1 comprises a housing 1 with cover a 2, the housing defining a fluid flow path containing one or two or more metal plates 3, 4 of relatively high thermal conductivity material such as aluminum or copper on which are fastened a number of self-regulating heater elements or tablets 5 of ceramic material such as lanthanum-doped barium titanate or the like with a positive temperature coefficient of resistivity (PTC) by means of a solder or an adhesive in other conventional manner which preferably conducts both heat and electrical current. Between those plates 3, 4 is a fin-means or strip-fin turbulator 6, which is preferably formed by a corrugated plate or the like having a base part 6.1 secured to the plate by solder or the like and a multiplicity of baffles 6.2 (see FIG. 4) which extend up from the base and which are staggered relative to each other and serve to impose a multiplicity of diversions of fluid flowing through the housing flow path to impose an artificial turbulence on a liquid flowing there through so that laminar flow of the fluid through the flow path is substantially prevented. It will be understood that the fin-means can comprise strip-metal materials of thermally conductive metals having various different baffle shapes blanked from the strip material to stand up from the strip metal base to provide the desired multiplicity of flow diverter means. Electrical current can be supplied to the tablets 5 through cables 7, 8 and contact springs 9, 10. The latter are clamped between the tablets 5 and an insulating plastic contact carrier 11, 12. Each of the plates 3, 4 is connected to ground 13.

An inlet 14 and an outlet 15 for the fuel to be heated are disposed in the housing 1. Preferably the housing defines the fluid flow path indicated by the arrows 25. As can be seen from the figure, the inlet 14 is connected to the space between the plates 3 and the contact carrier 11, while the outlet 15 is connected to the space between the plate 4 and the contact carrier 12. A passage 16 connects the space between the plate 3 and the contact carrier 11 to the turbulator 6, and a passage 17 forms the connection between the turbulator 6 and the space between the plate 4 and the contact carrier 12. In that arrangement, the housing means or the like, by itself or in cooperation with other means, defines a fluid flow path having a selected width, length and height and the plate is disposed with its width and length disposed in a plane extending along the length of the flow path so that the multiplicity of the baffles extend in the flow path to provide a multiplicity of fluid flow diversions along the path and substantially prevent laminar fluid flow in the path.

All this leads to the fuel fed in through the inlet 14 flowing zigzagging along the tablets 5 on the plate 3, through the turbulator 6 so that the flow is repeatedly diverted by the baffles, and along the tablets 5 on the plate 4 to the outlet 15. The PTC tablets 5 are heated to a particular temperature through the supply of electric power. The electrical resistance becomes increasingly high with increasing temperature, with the result that the temperature of the tablets cannot exceed a maximum value. The heat transfer from the tablets to the fuel is excellent, due to the strip-fin turbulator 6 disposed between the plates 3 and 4.

The device could be operated in such a way by thermostatic control that after a certain temperature of the fuel (for example, depending on the external temperature), the electric power supply is switched off. In colder weather it can be necessary for the tablets to be electrically heated all the time, which means high power consumption.

Figure 2:
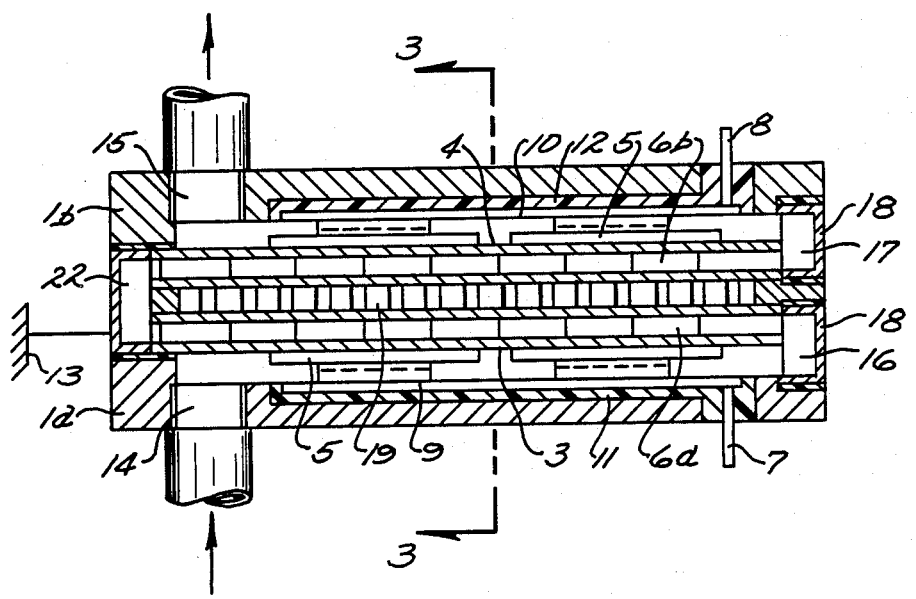
FIG. 2 shows a longitudinal section of a second embodiment.
Figure 3:
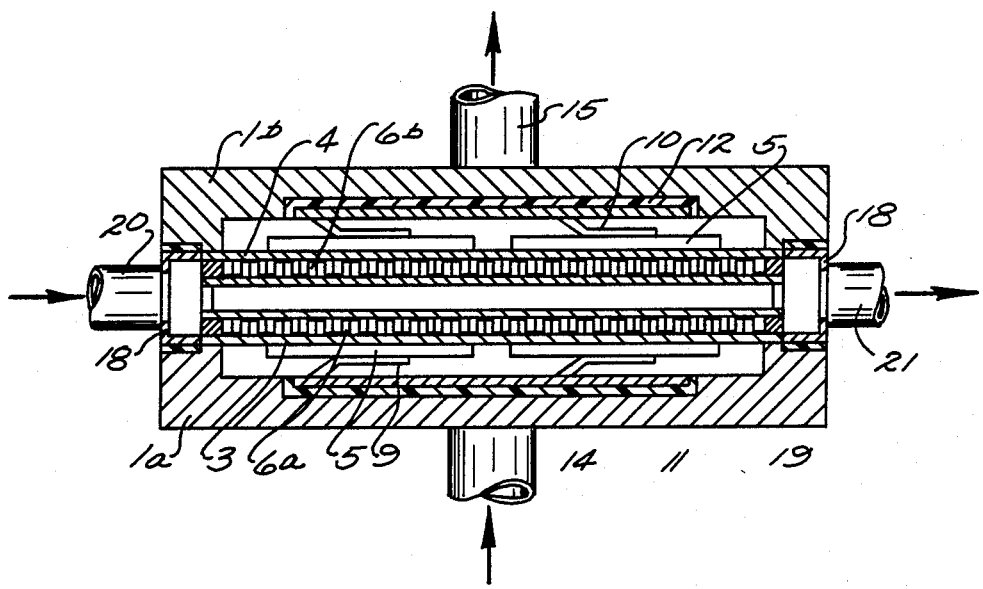
FIG. 3 shows a cross-section along the line III—III of FIG. 2.
Figure 4:
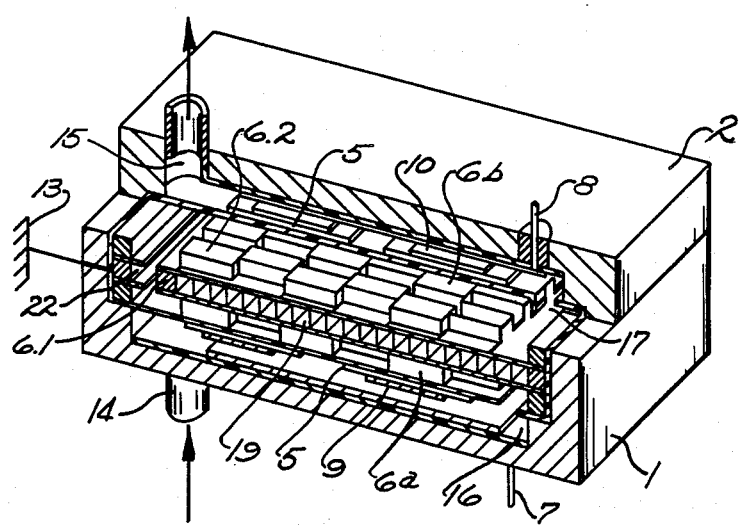
FIG. 4 shows a perspective view, partially cut away, of a third embodiments.

In order to avoid this and to ensure that heating the tablets is required only in the phase during and immediately after starting (at least until the engine cooling liquid has reached a certain temperature), the embodiments according to FIGS. 2, 3 and 4 are provided.

Equivalent parts are provided with the same reference numbers in the various embodiments.

In the embodiment according to FIGS. 2 and 3 the housing comprises two parts 1a, 1b, separated by U-shaped headers 18. Disposed between two metal plates 3, 4, provided with PTC tablets 5, is a sandwich of successively a first turbulator 6a through which the fuel is to flow, a turbulator 19 through which heated cooling liquid is to flow, and a second turbulator 6b through which the fuel is to flow. A supply branch 20 for cooling liquid opens out into the interior space of a header 18 to which the turbulator 19 is connected. The turbulator 19 is connected in a corresponding way to a header 18 situated opposite, and into which opens a discharge branch 21.

The fuel coming in at 14 flows along the tablets of the plate 3 via the passage 16 into the turbulator 6a and via the passage 22 into the turbulator 6b, and via the passage 17 along the tablets of the plate 4 to the outlet 15.

The cooling liquid coming in at 20 flows at right angles to the direction of the fuel flowing in the turbulator 6a, 6b to the outlet 21.

A thermostatic valve will normally be provided in the line to the inlet 20, and is opened as soon as the cooling water has reached a specific temperature. The lines 7, 8 can have in them a switch which switches off the electric power supply if the heated cooling water is flowing through the heat exchanger 19.

The embodiment according to FIG. 4 differs from that according to FIGS. 2 and 3 in that the passages 16, 17, 22, which in FIGS. 2 and 3 are formed by the interior spaces of the headers 18, in FIG. 4 consist of elongated grooves in the plates 3, 4 and in the boundary plates of the heat exchanger 19. This design thus has no headers 18. The housing 1 has a cover 2, like the embodiment according to FIG. 1.

Various modifications and additions are possible within the scope of the invention. The usual position of the heating device is a short distance from the fuel.

I claim:

1. A fluid heater comprising a thermally conductive metal plate, a self-regulating electrical resistance heater element of a ceramic material of positive temperature coefficient of resistivity mounted on the plate in heat-transfer relation thereto, fin-means of thermally conductive material secured in heat-transfer relation to the plate and extending from the plate for transferring heat from the plate to a fluid, means for electrically energizing the heater element to heat the plate, means defining a fluid flow path of selected cross-sectional configuration, the heater plate being disposed in said flow path, and the fin-means comprising a multiplicity of baffles disposed in the flow path for introducing a multiplicity of diversions of fluid flow along each line of flow through the paths for substantially preventing laminar fluid flow therethrough, the means defining the fluid flow path defining a path having a selected width, length and height, the plate being disposed with a width and length of the plate extending in a plane along the length of the flow path, and the fin-means comprising a strip metal member having a base portion secured to the plate and having a multiplicity of baffle portions upstanding from the base to provide said multiplicity of diversions along the length of said path, characterized in that means define a second fluid flow path separate from the first-named fluid flow path, an additional thermally-conducting metal plate is disposed between the fluid flow paths, fin-means comprising an additional strip metal member has a base secured to one side of the additional plate and has a multiplicity of baffle portions upstanding from the base into the first-named fluid flow path in heat-transfer relation with a fluid flowing in said first-named fluid flow path, and fin-means comprising another additional strip metal member has a base secured to an opposite side of the additional plate and has a multiplicity of baffle portions upstanding from the base into the second fluid flow path in heat-transfer relation to a fluid flowing through the second fluid flow path, the baffle portions of said additional strip metal members being disposed to provide a multiplicity of diversions of fluid flow along each of the paths for rapidly transferring heat from a fluid flowing in one of the fluid flow paths to a fluid flowing in the other fluid flow paths.

2. Heating device for fuel, in particular diesel oil, comprising a housing with an inlet and an outlet for the fuel, at least two metal plates (3, 4) which are disposed inside said housing an on which tablets made of material with a positive temperature coefficient (PTC) are fastened in a way which conducts heat and electricity, means for the supply of electrical power to the tablets, at least two turbulator (6; 6a, 6b) placed on each of said two metal plates (3, 4) 9 provided with PTC tablets, and passages (16, 17) are present to make the infed fuel flow from the inlet (14) over the first metal plate, through the turbulators and over the second metal plate to the outlet (15), characterized in that a turbulator (19) with connecting elements for heated cooling liquid is placed between two of the turbulators (6a, 6b) through which the fuel is to pass, while a passage (22) for the fuel is provided on one side of said cooling liquid turbulator.

3. Heating device according to claim 2 characterized in that the turbulators (6, 6a, 6b, 19) are of the strip-fin type.

4. Heating device according to claim 3, characterized in that the housing has elongated grooves in boundary plates thereof forming said passages (16, 17, 22).

* * * * *